United States Patent
Dunder

[11] Patent Number: 6,110,431
[45] Date of Patent: Aug. 29, 2000

[54] OZONE DISPENSING SYSTEM

[76] Inventor: Ove Karl Dunder, 2140 Winston Park Drive, Unit 28, Oakville, Ontario, Canada, L6H 5V5

[21] Appl. No.: 09/071,983

[22] Filed: May 5, 1998

Related U.S. Application Data

[60] Provisional application No. 60/045,823, May 5, 1997.

[51] Int. Cl.[7] .................................. B01J 19/08; B01J 19/12
[52] U.S. Cl. .............................. 422/186.12; 422/186.07; 422/186.14; 604/25
[58] Field of Search ........... 422/186.07, 186.12–186.14, 422/186.15; 604/25

[56] References Cited

U.S. PATENT DOCUMENTS

| | | | |
|---|---|---|---|
| 5,052,382 | 10/1991 | Wainwright | 128/202.25 |
| 5,106,589 | 4/1992 | Conrad | 422/186.15 |
| 5,158,748 | 10/1992 | Obi et al. | 422/100 |
| 5,207,993 | 5/1993 | Burris | 422/256 |
| 5,540,898 | 7/1996 | Davidson | 422/186.15 |
| 5,846,406 | 12/1998 | Sudhakar et al. | 208/216 R |
| 5,868,999 | 2/1999 | Karlson | 422/30 |

*Primary Examiner*—Kathryn Gorgos
*Assistant Examiner*—Wesley A. Nicolas
*Attorney, Agent, or Firm*—Eugene J. A. Gierczak

[57] ABSTRACT

An ozone dispensing system comprising an ozone gas generating means, electrical means to control the concentration of ozone produced by said ozone gas generating means, means to control the concentration of ozone in a preset dispensed volume, an oxygen supply and venting means disposed between said ozone gas generating means and said dispensing of said ozone, said venting means for continuous venting of said ozone.

19 Claims, 1 Drawing Sheet

OZONE DISPENSING SYSTEM

This application claims priority to U.S. Provisional Application 60/045,823, filed May 5, 1997.

FIELD OF INVENTION

This invention relates to improvements in the dispensing of ozone gas for therapeutic purposes.

BACKGROUND OF INVENTION

When ozone is used for therapeutic purposes, it is necessary to precisely control the dispensed ozone concentration, volume, pressure and rate of delivery.

It is common that ozone dispense systems heretofore known, use a flow controller in line with the ozone generator to maintain the ozone gas flow rate at a constant value. When a syringe is used for direct gas injections into the veins of a patient, it is filled by connecting it in line with the flow controller and the ozone generator. This has the disadvantage that the back pressure produced inside the ozone generator by the plunger of the syringe will cause the ozone concentration to vary from the preset value.

The rate at which ozone gas is dispensed directly into a vein of a patient is controlled by the manually applied pressure to the plunger of the gas-filled syringe. The ozone gas dispense rate is therefore subject to the experience and dexterity of the medical operator and will vary from person to person.

The pressure at which ozone gas is dispensed directly into a vein of a patient is controlled by the manually applied pressure to the plunger of the gas-filled syringe. The valves inside the veins will close down if excessive ozone gas pressure is applied and it is difficult for the operator to judge the back-pressure from the vein.

It is very tiresome for the operator to maintain a steady pressure on the plunger of the syringe for the 10 to 20 minutes that are required to dispense the typical ozone-gas volume used for therapeutic treatment.

The ozone gas dispense systems heretofore known using the above described control methods therefore suffer from a number of disadvantages.

(a) The ozone dispense systems heretofore known, use a flow controller in line with the ozone generator to maintain the ozone gas flow rate at a constant value. When a syringe is filled by connecting it in line with the flow controller and the ozone generator, the back pressure produced inside the ozone generator by the plunger of the syringe will cause the ozone concentration to vary from the preset value.

(b) The ozone gas dispense rate is subject to the variations of the manually applied pressure to the plunger of the gas-filled syringe by the medical operator.

(c) The ozone gas dispense pressure is subject to the variations of the manually applied pressure to the plunger of the gas-filled syringe by the medical operator.

(d) The operator will suffer fatigue in his hand from maintaining a steady pressure on the plunger of the syringe for an extended period of time.

OBJECTS AND ADVANTAGES

Accordingly it is an object of this invention to provide an ozone dispense system which uses a flow controller in line with an ozone generator and a catalytic converter to maintain the ozone gas flow rate at a constant value. A syringe is then filled by connecting it into the line between the ozone generator and the catalytic converter. There is substantially no back pressure produced inside the ozone generator by the plunger of the syringe because the flow of ozone gas between the ozone generator and the catalytic converter is not interrupted. Any back pressure will be vented through the catalytic converter. Therefore the ozone concentration is maintained at the preset value.

It is another object of this invention to provide an ozone dispense system in which the ozone gas dispense rate is not subject to the variations of the manually applied pressure to the plunger of the gas-filled syringe by the medical operator. The applied pressure is precisely controlled by electro-mechanical means.

It is yet another object of this invention to provide an ozone dispense system in which the ozone gas dispense pressure is not subject to the variations of the manually applied pressure to the plunger of the gas-filled syringe by the medical operator, and also in which the pressure from the injected ozone gas in the vein is kept substantially constant. The applied pressure is monitored with a pressure sensor and it is then maintained accurately by electro-mechanical means.

Moreover, it is an object of this invention to provide an ozone dispense system in which the operator will not suffer fatigue in his hand from maintaining a steady pressure on the plunger of the syringe for an extended period of time. The pressure is applied by electro-mechanical means.

It is an aspect of this invention to provide an ozone dispensing apparatus comprising: ozone generating means; means for dispensing said ozone; pressure regulating means for regulating the pressure of said ozone; and microprocessor means for controlling the dispensing and pressure of said ozone.

It is another aspect of this invention to provide an ozone dispensing apparatus comprising: means for generating ozone at a preselected pressure; means for dispensing said generated ozone; conduit means for connecting the ozone generating means to the dispensing means; and means disposed between said ozone generating means and said dispensing means for venting ozone above said preselected pressure.

It is yet another aspect of this invention to provide an ozone dispense system comprising: an ozone gas generating means; means to control the concentration of ozone produced by said ozone gas generating means; means to control the dispense rate of ozone produced by said ozone gas generating means; means to measure the pressure of said dispensed ozone gas; and an oxygen supply.

LIST OF DRAWINGS

These and other objects and features of the invention shall now be described in relation to the following drawings:

FIG. 1 is a schematic drawing showing the interconnections to the Microcontroller, Power Syringe, Valve, Pressure Sensor, Flow Controller and the Ozone Generator.

REFERENCE NUMERALS IN DRAWINGS

| | | |
|---|---|---|
| 1 Ozone Dispense System | 5 Catalytic Converter | 9 Pressure Sensor |
| 2 Stepper Motor | 6 Valve | 10 Flexible Tube |
| | 7 Ozone Generator | 11 Needle |

-continued

| | | |
|---|---|---|
| 3 Oxygen Bottle | 8 Microprocessor Controller | 12 Flow Controller |
| 4 Power Syringe | | |

SUMMARY OF INVENTION

A microprocessor controller controls the ozone concentration of the gas aspirated into a power syringe.

The concentration of the aspirated ozone is maintained at a substantially constant preset level.

The dispense rate and pressure of the ozone gas into a vein is substantially maintained at a preset level.

Operator fatigue, caused by the long steady pressure on the plunger of the syringe, is eliminated since the system is automatic.

DETAILED DESCRIPTION OF PREFERRED EMBODIMENT-FIG. 1

Figure 1:
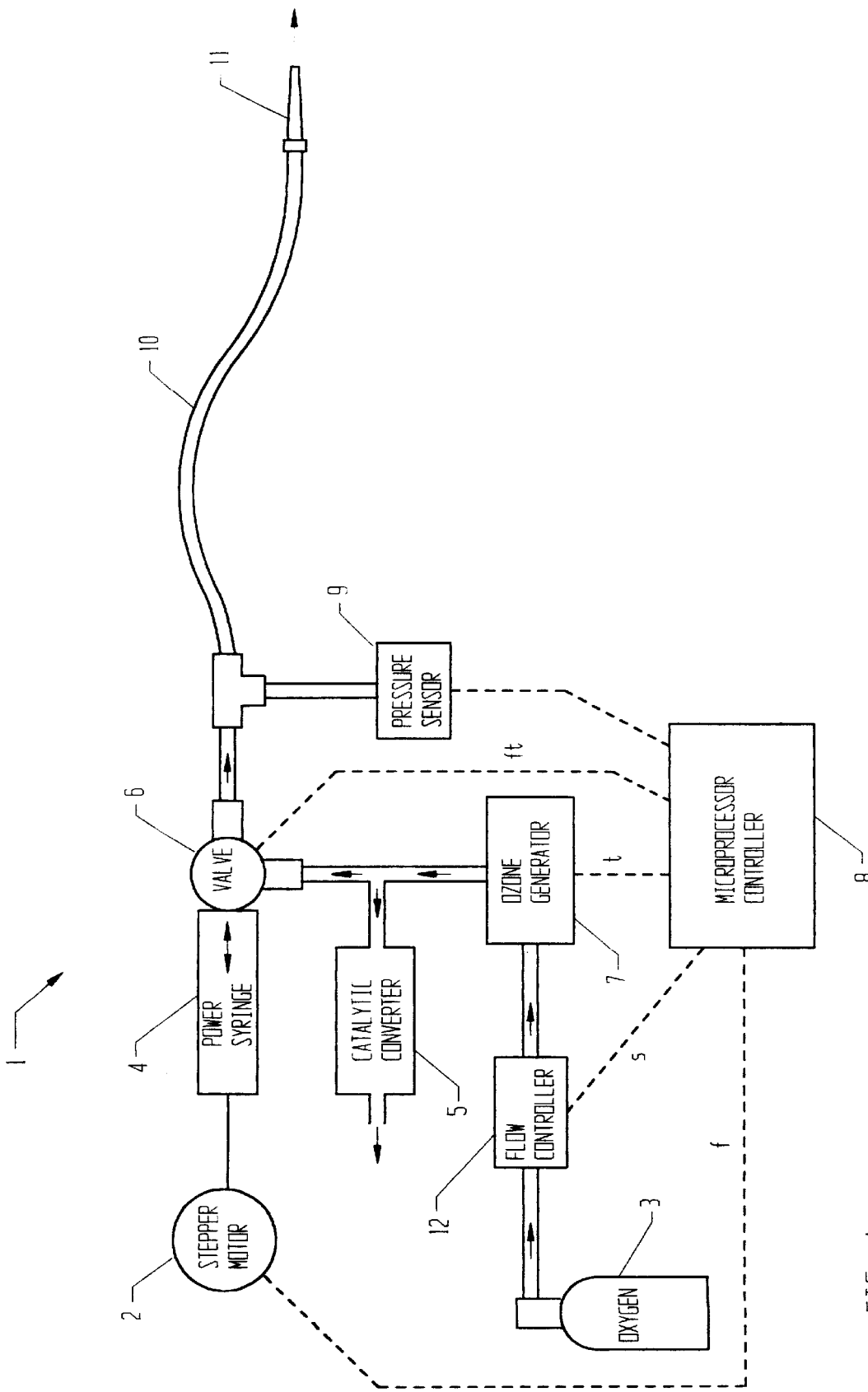

The ozone dispense system 1 illustrated comprises a microprocessor controller 8, a Power Syringe 4 driven by stepper motor 2, a valve 6, an ozone generator 7, a catalytic converter 5, a pressure sensor 9, a needle 11 attached to the end of a flexible tube 10, a flow controller 12, and an oxygen supply 3.

The microprocessor controller 8 has four control line outputs and one sensor input. The first line f controls the dispense and aspirate rate and volume of the syringe plunger 4 through the use of stepper motor 2. The second line s controls flow controller 12. The third line t controls the ozone generator. In particular the means to measure the pressure of ozone produced by the ozone gas generating means is a piezoelectric type pressure sensor which is monitored by microprocessor controller 8. The fourth line ft controls the valve 6 position. The input line i from the pressure sensor 9 monitors the ozone gas pressure applied through the needle 11.

The ozone generator 7 generates ozone from oxygen supplied by oxygen bottle 3. The oxygen flow rate is controlled by flow controller 12. The ozone is then channelled to catalytic converter 5 and also ported through valve 6 to Power Syringe 4. The power syringe dispenses the ozone through flexible tube 10 and needle 11.

However the stepper motor 2 and power syringe 4 design can be replaced with other types of metering devices and the catalytic converter can be replaced with other types of ozone destruct devices or eliminated entirely if the ozone outlet line is vented outside the building.

From the description above, a number of advantages of the ozone dispense system are observed:

(a) The ozone dispense system accurately maintains the ozone concentration at the preset value.

(b) The ozone dispense system maintains the ozone gas dispense rate with little, if any, variations.

(c) The ozone dispense system maintains the ozone gas dispense pressure with little, if any, variations.

(d) The ozone dispense system uses electro-mechanical means to maintain a steady pressure on the plunger of the syringe.

Operation-FIG. 1

The microprocessor controller controls the ozone concentration produced by the ozone generator 7 and the valve 6 position. It also controls the direction, velocity and number of steps that the stepper motor uses to move the plunger inside the syringe.

Oxygen is supplied to ozone generator 7 from oxygen bottle 3 and the flow rate is regulated by flow controller 12. The flow controller comprises a device to accurately regulate the flow of oxygen to the ozone generator 7. In one embodiment the flow controller consists of a linear variable differential transducer (LVDT) which controls a needle valve. The flow controller has a built in sensor that monitors the flow rate of oxygen into the ozone generator 7. As an example, but not to limit the scope of the invention herein, the rate of delivery could be set for the delivery of oxygen to the ozone generator 7 of up to 200 ml/min. Once the sensor in the flow controller detects a flow rate greater or lesser than the preselected amount the LVDT is adjusted to compensate to the desired preselected level by means of an electrical feedback loop.

In the preferred embodiment, as shown in FIG. 1, a small percentage (0–5%, for example) of the oxygen delivered to the ozone generator is converted to ozone in the silent corona discharge inside ozone generator 7. Description of an ozone generator may be found in U.S. provisional application filed May 5, 1997 as application No. 60/045,534 which is adopted by reference herein, although other ozone generators could be used. The ozone is channelled to catalytic converter 5 by means of a suitable conduit as shown in FIG. 1 as well as being ported through valve 6 to power syringe 4.

The valve 6 comprises a one way check valve so that ozone can communicate with the power syringe 4 but the valve 6 will prevent the back flow of ozone back towards the ozone generator or catalytic converter. This assists in maintaining a steady pressure on the plunger of the syringe 4. After the ozone concentration in the gas stream has stabilized to the desired level, power syringe 4 aspirates the preset volume of ozone. The aspirate rate is set to be less than the flow rate between ozone generator 7 and catalytic converter 5. This assures a constant ozone concentration during aspiration, because the pressure in the ozone gas stream remains constant.

Moreover the ozone gas stream exiting ozone generator 7 is fed to valve 6 as described above as well as being directed to catalytic converter 5. The catalytic converter 5 can comprise of a variety of materials so as to convert ozone ($O_3$) to oxygen when vented to the atmosphere as shown by the arrow in FIG. 1. In one preferred embodiment the catalytic material in the catalytic converter comprises $MnO_2$. The function of the conduit leading to the catalytic converter and then venting to atmosphere is to vent any pressure build up that may develop between the ozone generator 7 and valve 6 which again assists in maintaining the gas dispense pressure or rate with little if any variation. If there were no environmental concerns the ozone could be directly vented to the ambient atmosphere. Alternatively, a pressure regulator could be used in place of the catalytic converter and set at a small pressure above atmospheric pressure, although optimal results occur when venting to atmospheric pressure.

The stepper motor 2 moves the plunger inside the syringe 4. Any number of means could be used to accurately and efficiently move the plunger inside the syringe 4 to dispense ozone. Good results have been achieved by utilizing a stepper motor which can be displaced up to 24,000 increments. For example, if the power syringe has a capacity of 50 ml and one desires to dispense 20 ml of $O_3$ the stepper motor can displace the plunger [(20/50)×24,000] in 9,600 incremental steps. This contributes to the accuracy of the ozone dispense rate.

Power syringe 4 then dispenses the ozone gas, which it previously aspirated, through valve 6, tube 10 and needle 11. Pressure sensor 9 continuously monitors the gas pressure delivered to the needle and maintains it at a preset level by adjusting the dispense speed of power syringe 4. For example, if the pressure sensor senses a dispensing pressure higher than the selected value, a signal is sent to the microprocessor 7, thereby causing the stepper motor to stop or slow down until the dispensing pressure returns to the selected value. The valve 6 is a one way valve and therefore a build up of pressure will not flow back toward the generator 7. As long as pressure sensor 9 reads a lower dispensing pressure than selected the stepper motor 2 will continue to dispense at the preset rate (i.e. to maintain a constant dispensing rate). It is important to limit the ozone gas dispense pressure because an excessive gas pressure dispensed inside a vein will cause some of its valves to close.

The microprocessor controller 8 is designed to sense, monitor and activate the components as described through feed back paths schematically shown in FIG. 1.

EXAMPLE

The ozone dispense system described herein can be utilized to accurately maintain, and dispense ozone. As an example, the system can be set at the following:

| | |
|---|---|
| Rate of Delivery | 0 to 200 ml/min |
| Concentration | 0 to 50 micro grams $O_3$/ml $O_2$ |
| Flow controller can run at | up to 200 ml/min |
| Dispense Pressure | up to 1.5 psi |

Although the preferred embodiment as well as the operation and use have been specifically described in relation to the drawings, it should be understood that variations in the preferred embodiment could be achieved by a person skilled in the trade without departing from the spirit of the invention as claimed herein.

I claim:

1. An ozone dispense system comprising:
    (a) an ozone gas generating means,
    (b) electrical means to control the concentration of ozone produced by said ozone gas generating means,
    (c) means to control the concentration of ozone in a preset dispensed volume,
    (d) an oxygen supply
    (e) venting means disposed between said ozone gas generating means and said dispensing of said ozone, said venting means for continuous venting of said ozone.

2. The ozone dispense system of claim 1 wherein said ozone gas generating means comprises a corona discharge means.

3. The ozone dispense system of claim 1 wherein said electrical means comprises a microprocessor control circuit.

4. The ozone dispense system of claim 1 wherein said means to control said dispense rate of ozone produced by said ozone gas generating means are of an electrical nature.

5. The ozone dispense system of claim 4 wherein said means to control said dispense rate of ozone produced by said ozone gas generating means comprises a microprocessor control circuit.

6. The ozone dispense system of claim 1 further including means to measure the pressure of said dispensed ozone gas.

7. The ozone dispense system of claim 6 wherein said means to measure said pressure of ozone produced by said ozone gas generating means is of an electrical nature.

8. The ozone dispense system of claim 7 wherein said means to measure said pressure of ozone produced by said ozone gas generating means is a piezoelectric type pressure sensor.

9. The ozone dispense system of claim 1 wherein the flow of oxygen from said oxygen supply is regulated by an electrically controlled flow controller.

10. An ozone dispense system comprising:
    (a) an ozone gas generating means,
    (b) means to electrically control the concentration of ozone produced by said ozone gas generating means,
    (c) means to electrically control the dispense rate of ozone produced by said ozone gas generating means
    (d) means to control the concentration of ozone in a preset dispensed volume
    (e) an oxygen supply,
    (f) venting means disposed between said ozone generating means and said dispensing of said ozone, said venting means for continuous venting of said ozone.

11. Ozone dispensing apparatus comprising:
    (a) ozone generating means;
    (b) means for dispensing said ozone;
    (c) pressure regulating means for regulating the pressure of said ozone;
    (d) microprocessor means for controlling the dispensing of said ozone;
    (e) means to control the concentration of ozone in a preset dispensed volume;
    (f) venting means disposed between said ozone generating means and said dispensing means for continuous venting of said ozone.

12. Ozone dispensing apparatus as claimed in claim 11 wherein said dispensing means comprises power syringe means.

13. Ozone dispensing apparatus as claimed in claim 12 wherein said power syringe means is activated by a stepper motor.

14. Ozone dispensing apparatus as claimed in claim 11 wherein said means to control the concentration of ozone includes means for continuous venting of ozone.

15. Ozone dispensing apparatus as claimed in claim 14 wherein said venting means comprises a catalytic converter to convert $O_3$ to $O_2$ vented to the atmosphere.

16. Ozone dispensing apparatus as claimed in claim 15 wherein said pressure regulating means includes a pressure sensor for sensing the pressure of said ozone dispensed by said power syringe means.

17. Ozone dispensing apparatus comprising:
    (a) means for generating ozone at preselected pressure;
    (b) means for dispensing said generated ozone;
    (c) conduit means for connecting said ozone generating means to said dispensing means;
    (d) venting means disposed between said ozone generating means and said dispensing means for continuous venting of ozone.

18. Ozone dispensing apparatus as claimed in claim 17 wherein said continuous venting means comprises a catalytic converter for converting ozone to oxygen.

19. Ozone dispensing apparatus as claimed in claim 17 wherein said catalytic converter includes $MnO_2$.

* * * * *